United States Patent [19]

Peniston et al.

[11] 3,922,260

[45] Nov. 25, 1975

[54] PROCESS FOR DEPOLYMERIZATION OF CHITOSAN

[76] Inventors: Quintin P. Peniston, Rte. 7, Box 7710, Bainbridge Island, Wash. 98110; Edwin Lee Johnson, Rte. 5, Box 4246, Issaquah, Wash. 98027

[22] Filed: Aug. 24, 1973

[21] Appl. No.: 391,270

[52] U.S. Cl. .................. 260/211 R; 8/62; 106/25; 106/162; 117/165; 252/61
[51] Int. Cl.² .......................................... C07C 95/04
[58] Field of Search ............................ 260/211 R

[56] References Cited
UNITED STATES PATENTS
2,842,049   7/1958   Delangre ..................... 260/211 R OTHER PUBLICATIONS
Fuson, R. C., *Advanced Organic Chemistry*, (1954), pp. 522–525, Wiley and Sons Publishers, New York, N.Y.

Gortner, R. A. and Sandstrom, W. M., *Proline and Tryptophan as Factors Influencing the Accuracy of Van Slyke's Method for Determination of Nitrogen Distribution in Proteins,* J.A.C.S., Vol. 47, (1925), pp. 1663–1671.

*Primary Examiner*—Johnnie R. Brown
*Assistant Examiner*—Cary B. Owens
*Attorney, Agent, or Firm*—Rines and Rines

[57] ABSTRACT

This disclosure deals with the deaminative cleavage of chitosan into reduced chain-length molecules for such purposes as reducing viscosity, increasing solubility, and generally changing poly-electrolyte characteristics and the like.

2 Claims, 1 Drawing Figure

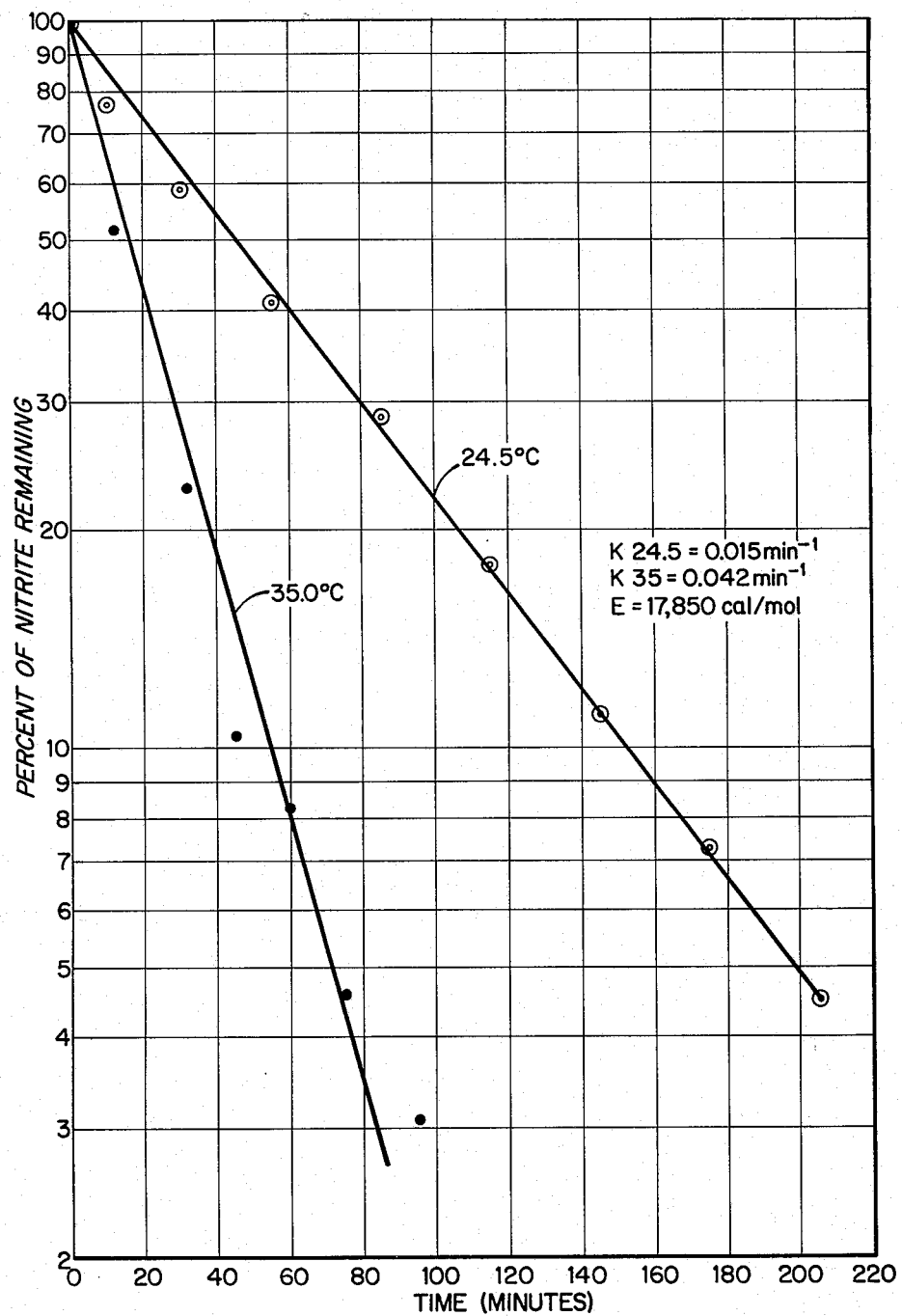

PROCESS FOR DEPOLYMERIZATION OF CHITOSAN

The present invention relates to a novel process for depolymerizing chitosan to produce reduced chain-length products therefrom, including amino polysaccharide fragments and the like.

Chitosan is derived from the natural carbohydrate polymer chitin, the structural material in crustacea shells such as crab, lobster, shrimp, prawns, crayfish, etc. Chitin is also found in insect skeletons and wings and in some fungi. The primary building unit in the chitin polymer is 2-deoxy-2-(acetyl amino) glucose, such units being combined by beta, 1-4 glycosidic linkages into a linear polymer with a degree of polymerization of hundreds of units, quite analogous to cellulose.

Chitin is insoluble in almost all solvents except strong mineral acids. When it is treated with strong alkalis (50% NaOH) at high temperature (150°C), the acetyl groups attached to the nitrogen atoms are removed yielding chitosan, as described, for example, in our prior U.S. Pat. No. 3,533,940. This is still a long chain polymer, but each building unit contains a free primary amine group. Chitosan is soluble in dilute aqueous solutions of many organic acids, forming highly viscous solutions and being formable into films and fibers for well-known uses, including those described in said patent.

In some applications, however, it is desirable to reduce the chain length of the chitosan molecules so as to reduce viscosity of its solutions, and/or to increase its solubility, and/or generally to change its molecular character as a poly-electrolyte material. In general, however, this has not been easily accomplished, particularly since chitosan is quite resistant to hydrolysis by acids. In one preparation, for example, partial hydrolysis was accomplished by treating a one percent chitosan solution in 3.3 Normal (12%) hydrochloric acid at 100°C for 35 hours. In this case, a series of oligosaccharides with one to seven building units per molecule was obtained, as described, for example, in "Isolation of a homologous series of oligosaccharides from chitin", S. A. Barker, A. B. Foster, M. Stacey, and J. M. Webber, Chemistry and Industry (1957), p.208. Recovery of products from such a strongly acid solution, however, is a difficult and costly procedure, and it would be desirable to accomplish equivalent cleavage of the chitosan with far better economy of reagents and under less drastic and tedious conditions.

An object of the invention, therefore, is to provide a new and improved process for depolymerization or chain cleavage of chitosan and the like, not subject to the above-described disadvantages.

A further object is to provide novel products resulting from such a process, other and further objects being hereinafter set forth and delineated in the appended claims.

The invention will now be described with reference to the accompanying drawing, illustrating the rate of nitrite consumption by chitosan as a function of temperature. In summary, however, the invention involves novel deaminative cleavage of chitosan into reduced chain-length molecules. Preferred details are hereinafter described.

One of the characteristic reactions of free aliphatic primary amines is their reaction with nitrous acid. While aromatic amines form more or less stable diazonium compounds, aliphatic amines are in general deaminated by treatment with nitrous acid. The reaction is thought to be formation of an amine salt with the nitrous acid, followed by decomposition with evolution of molecular nitrogen and replacement of the original amino group by a hydroxyl group. In some instances, olefins are formed or rearrangements may occur as described, for example, in *Advanced Organic Chemistry*, p.522, Reynold C. Fuson, Wiley and Sons Publishers, New York, 1954.

In general, the evolution of nitrogen is stoichiometric with the amino group, so that the volume of nitrogen can be used for quantitative determination of free amine, as in the vanSlyke procedure for free amino nitrogen in protein hydrolyzates. Often the reaction is used to prepare alcohols from amines. The reaction can be accomplished in dilute aqueous solution at ambient temperature.

In studies underlying the present invention, a determination was made of the effect of partial deamination on the poly-electrolyte character of chitosan. A moderately viscous two percent solution of chitosan in 6% acetic acid was treated with sufficient sodium nitrite to react with about 20 percent of the amino groups. The sodium nitrite solution was added in small increments over a one half-hour period. Evolution of nitrogen was observed as expected, but also, an unexpected marked decrease in viscosity occurred. Since reduction of viscosity of polymer solutions often is an indication of depolymerzation, the above solution was analyzed for reducing sugars in comparison with a similar solution of untreated chitosan. An increase in reducing sugars corresponding to the amount of sodium nitrite used was found. This was again evidence of depolymerization, since, in a linear glycosidic polymer, only the last unit in a chain has a free reducing group. Cleavage of a chain produces new reducing groups in proportion to the number of glycosidic links ruptured.

Whereas chitosan is normally soluble in dilute acetic acid and becomes insoluble when the pH of the solution is raised to about 6.5, when the sodium nitrite treated solution was neutralized no precipitation occurred.

The observed decrease in viscosity, increase in reducing sugars, and loss of precipitability, all suggested that the reaction of sodium nitrite with chitosan resulted in cleavage of the chitosan chain molecules into shorter fragments, as well as in deamination. In view of above evidence further experiments were conducted to explore the stoichiometry and kinetics of the cleavage reaction. These are illustrated by the following examples showing the scope and utility of the invention.

EXAMPLE 1

A solution of chitosan (2.00 g = .0124 moles in 100 ml of normal (6%) acetic acid) was treated at 20°C with a solution containing 0.0855 grams of sodium nitrite (0.00124 moles), i.e. 10% of the theoretical amount for complete deamination. The sodium nitrite was added in small increments over a ½ hour period using vigorous mechanical stirring. It was stirred an additional half hour and was then neutralized with dilute sodium hydroxide solution, using a glass electrode pH meter. It was noted that whereas untreated chitosan is completely precipitated at pH 6.5, only partial precipitation of the nitrous acid reaction product occurred at pH 7.4.

After collection of the flocculent precipitate on a filter and washing with water, alcohol and ether and final drying in vacuo at 60°C, a yield of about 60 percent of theory was obtained.

Nitrogen analysis on the dried material showed 7.27 percent, a decrease of about 12 percent from the original chitosan.

A reducing value determination showed 188 mg $Cu_2O$ per gram, equivalent to 84.3 m g glucose, demonstrating an average chain length of about 13 units.

EXAMPLE 2

Following the procedure of Example 1, the intrinsic viscosity was then determined on the precipitated material using 1.0, 0.5 and 0.1 percent solutions in normal acetic acid. An Ostwald type viscometer was used with an outflow time for water of 91.8 seconds. A value of 0.4 was found for intrinsic viscosity in comparison with 14 for the untreated chitosan. If a degree of polymerization of 500 is assumed for the unchanged chitosan, and molecular size is considered to be proportional to intrinsic viscosity, an average D.P. of 14 for the 10 percent deaminated chitosan appears indicated. This is in close agreement with theoretical analysis for random cleavage of chain linkages as described, for example, by W. Kuhn, Ber. 63:1503 (1930).

For the simple case where the probability of bond rupture is the same for all bonds and the initial chain length is very long, the weight fraction of fragments having $\eta$ primary units per fragment can be represented as $$\eta \alpha^2 (1 - \alpha)^{\eta-1}$$

where $\alpha$ is the fraction of bonds ruptured. Applying this equation to the cases where $\alpha = 0.1, 0.2, 0.3$ and $0.4$, the resulting amounts of the small fragments are obtained in Table 1.

When 10 percent of the bonds are broken, the weight average D.P. is about 15.5 with only 16 percent above a D.P. of 30. When 20 percent of the bonds are broken, the weight average D. P. is 7 units and 85 percent of the material has a D.P. less than 15. With 40 percent of the bonds broken, 50 percent of the material has a D.P. of 3 or less and 89 percent is below a D.P. of 8.

EXAMPLE 3

To 20 grams of chitosan (0.124 mols) dissolved in 1,000 ml of normal acetic acid, was added 8.5 g of $NaNO_2$ (0.124 mols) in increments over a ½ hour period. The mixture was stirred at 25°C and the rate of consumption of nitrous acid was followed by a colorimetric procedure of the type described in *Standard Methods for the Examination of Water and Waste Water*, American Public Health Assn., 12th edition, 1965, pages 205–208. After seven hours, 16 percent of the nitrite remained. The mixture was allowed to stand for 48 hours after which less than one percent of the nitrite remained.

Reducing sugars were determined in the product solution by the Schoorl procedure set forth, for example in "Sugar Analysis", Brown and Zerban, Wiley and Sons Publishers, New York, Third edition, 1941, pg. 828. Calculated as glucose, they amounted to 98 percent of the original weight of chitosan.

Nitrogen was also determined in the product solution by the Kjeldahl procedure; and only traces were found, indicating complete deamination.

During the deamination, the viscosity of the reacting solution was determined using a Brookfield viscometer. From an initial value of about 24 centipoises for the chitosan solution, the value dropped to 12 centipoises during mixing of the sodium nitrite and was less than 2 centipoises after twenty minutes.

TABLE I

| N = D.P. of Fragment | Yields of Chitosan Fragments by Random Cleavage | | | | | | | |
|---|---|---|---|---|---|---|---|---|
| | 10% Bonds Broken | | 20% Bonds Broken | | 30% Bonds Broken | | 40% Bonds Broken | |
| | 1 | 2 | 1 | 2 | 1 | 2 | 1 | 2 |
| 1 | 1.00 | 1.00 | 4.00 | 4.00 | 9.00 | 9.00 | 16.0 | 16.0 |
| 2 | 1.80 | 2.80 | 6.40 | 10.40 | 12.60 | 21.60 | 19.2 | 35.2 |
| 3 | 2.43 | 5.23 | 7.66 | 18.06 | 13.20 | 34.80 | 17.3 | 52.5 |
| 4 | 2.92 | 8.15 | 8.21 | 26.27 | 12.40 | 47.2 | 13.8 | 66.3 |
| 5 | 3.28 | 11.43 | 8.20 | 34.47 | 10.5 | 57.7 | 10.4 | 76.7 |
| 6 | 3.50 | 14.93 | 7.88 | 42.35 | 8.8 | 66.5 | 7.5 | 84.2 |
| 7 | 3.66 | 18.59 | 7.33 | 49.68 | 7.2 | 73.7 | 5.2 | 89.4 |
| 8 | 3.83 | 22.42 | 6.69 | 56.37 | 5.76 | 79.46 | | |
| 9 | 3.84 | 26.26 | 6.05 | 62.42 | 4.53 | 83.99 | | |
| 10 | 3.87 | 30.13 | 5.37 | 67.79 | 3.51 | 87.50 | | |
| 11 | 3.84 | 33.97 | 4.75 | 72.54 | | | | |
| 12 | 3.79 | 37.76 | 4.12 | 76.66 | | | | |
| 13 | 3.63 | 41.39 | 3.60 | 80.26 | | | | |
| 14 | 3.50 | 44.89 | 3.08 | 83.35 | | | | |
| 15 | 3.44 | 48.33 | 2.53 | 85.88 | | | | |
| 16 | 3.18 | 51.51 | | | | | | |
| 17 | 3.05 | 54.56 | | | | | | |
| 18 | 2.90 | 57.46 | | | | | | |
| 19 | 2.79 | 60.25 | | | | | | |
| 20 | 2.68 | 62.93 | | | | | | |
| 21 | 2.56 | 65.49 | | | | | | |
| 22 | 2.46 | 67.95 | | | | | | |
| 23 | 2.35 | 70.30 | | | | | | |
| 24 | 2.25 | 72.55 | | | | | | |
| 25 | 2.15 | 74.70 | | | | | | |
| 26 | 2.06 | 76.76 | | | | | | |
| 27 | 1.97 | 78.73 | | | | | | |
| 28 | 1.88 | 80.61 | | | | | | |
| 29 | 1.79 | 82.40 | | | | | | |
| 30 | 1.74 | 84.14 | | | | | | |

Note:
Column 1 = Weight yield of fragments in percent
Column 2 = Sum N

The product solution was deashed by passage over cation and anion absorption ion exchange resins and was then evaporated at reduced pressure to a small volume. Total solids determination indicated a product yield of 95 percent of the original chitosan. The dried product was a heat sensitive viscous syrup.

The example demonstrates that consumption of nitrite, deamination and depolymerization of chitosan proceed simultaneously, and that the reaction goes substantially to completion when equimolar quantities of chitosan and sodium nitrite are used.

EXAMPLE 4

To 900 ml of a two percent solution of chitosan in normal acetic acid, there was added 175 ml of sodium nitrite solution containing 229 mg of sodium nitrite; i.e. 0.03 mols per mol of chitosan. The mixture was stirred in a constant temperature bath at 24°±0.5°C. Samples were withdrawn at intervals for nitrite determination. A similar run also using 0.03 mols of sodium nitrite per mol of chitosan was conducted at 35°±0.2°C. Results are shown in the graph of the drawing, plotting the log of percent of nitrate remaining as a function of time during the nitrite consumption by chitosan.

The data presented in the following Table II and the substantially proportionate response shown in the drawing indicate that the deamination follows a pseudo first-order mechanism for the conditions used; i.e. three mol percent sodium nitrite based on the chitosan primary unit. Viscosity and reducing sugar data suggest that cleavage of the glycosidic bonds is substantially instantaneous, following nitrosamine formation.

TABLE II

Rates of Nitrite Consumption by Chitosan

| Time min. | At 24.5°C NaNO$_2$ mg/l | Percent remaining | Time min. | At 35°C NaNO$_2$ mg/l | Percent remaining |
|---|---|---|---|---|---|
| 0 | 214 | 100 | 0 | 216 | 100 |
| 10 | 164.5 | 76.9 | 12 | 111 | 51.5 |
| 30 | 125.8 | 58.8 | 32 | 49.4 | 22.9 |
| 55 | 86.0 | 40.2 | 45 | 22.4 | 10.4 |
| 85 | 60.5 | 28.3 | 60 | 17.9 | 8.3 |
| 115 | 38.3 | 17.9 | 75 | 9.94 | 4.6 |
| 145 | 23.8 | 11.1 | 95 | 6.75 | 3.1 |
| 175 | 15.6 | 7.3 | | | |
| 205 | 9.6 | 4.5 | | | |

Where higher ratios of sodium nitrite-to-chitosan are used, such as 100 mol percent as in Example 3, the reaction rate is probably dependent on both nitrite and poly-glucosamine concentration, as evidenced by the longer time required for the reaction to approach completion.

Having described the discovered reaction process and having illustrated how it may be conducted by several examples, it is now in order to discuss the utility of the products derived from the process. These products of the reaction appear to be new compositions of matter. Since the cleavage reaction entails a deamination at the point of cleavage, the products are chitosan fragments consisting of 2-deoxy-2-amino glucose for all units in the chain except for the unit at one end of the chain which is an amine-free reducing sugar. Such products are not formed by normal hydrolytic reactions which cleave glycosidic linkages without deamination. It has been shown how these fragments can possess a wide range of molecular size from nearly that of the original chitosan to small fragments with only one or two building units. In larger fragments, the extent of deamination may be only one part in several hundred; i.e. the fragment would possess nearly the same amine content as the original chitosan. In small fragments, however, the extent of deamination is much greater; e.g. in the dimer, it would be 50 percent. For a D.P. of 33, however, the deamination amounts to only three percent. It is thus possible to prepare short or reduced chain fragments with only a few units while retaining the poly-electrolyte basicity of the original chitosan. Such products can be useful in many industrial applications where increased solubility, diffusibility and osmotic properties are desired. These may include coatings, inks, flotation agents, adhesives, sizes and many others.

The process of the invention, moreover, can be carried out in dilute aqueous solution under very mild conditions. This eliminates the need for high concentrations of strong mineral acids usual for chitosan hydrolysis, and greatly simplifies the isolation of reaction products. Thus, corrosion resistant equipment is not needed for the reaction or for the isolation of products. The only reactant, sodium nitrite, is used in stoichiometric quantity and is converted to nitrogen gas and the sodium salt of the acid used to dissolve the chitosan. Many organic acids can be used, such as formic, acetic, tartaric, citric, etc. The latter can be readily removed by ion exchange resin treatment, ultrafiltration or ion exclusion, leaving a pure solution of depolymerized chitosan.

The process is admirably suited, furthermore, to reaction "in situ" whereby chitosan is depolymerized in the presence of other substances, or during the course of other reactions. Thus an originally viscous solution of chitosan in a coating mixture or adhesive can be increased in fluidity by addition of sodium nitrite. This is of value in many technical operations conducted in stages, such as printing, textile dying, photography, etc. The capacity of chitosan to form poly-electrolyte complexes with anionic polymers or colloids can be altered by the reaction through reduction in molecular size and deamination.

Further modifications will also occur to those skilled in this art, and all such are considered to fall within the spirit and scope of the invention as defined in the appended claims.

What is claimed is:

1. A process for the deaminative cleavage of chitosan into fragments, consisting essentially of treating the chitosan in a mild acidic solution with sodium nitrite as a source of nitrous acid, and controlling the rate of nitrite consumption by the chitosan to produce amino polysaccharide fragments consisting of linear chains of 2-deoxy-2 amino glucose units having one terminal unit in the form of an aminefree reducing sugar and to produce a degree of polymerization ranging from the di-saccharide to nearly that of the original chitosan.

2. Amino polysaccharide fragments produced by the process of claim 1.

* * * * *